Figure 1:
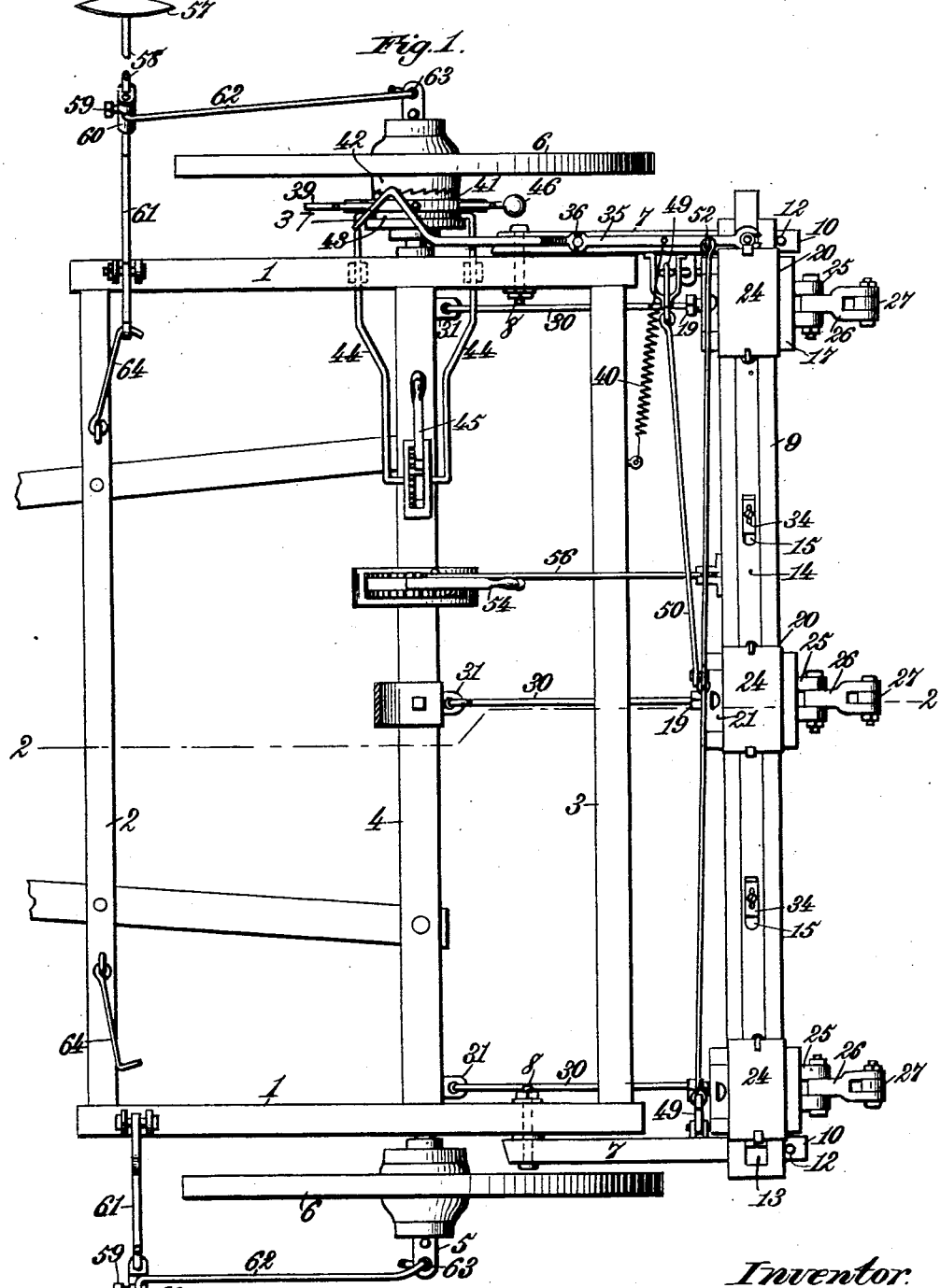

(No Model.)  3 Sheets—Sheet 2.
L. W. POWELL.
PLANTING AND SEEDING MACHINE.
No. 593,493. Patented Nov. 9, 1897.
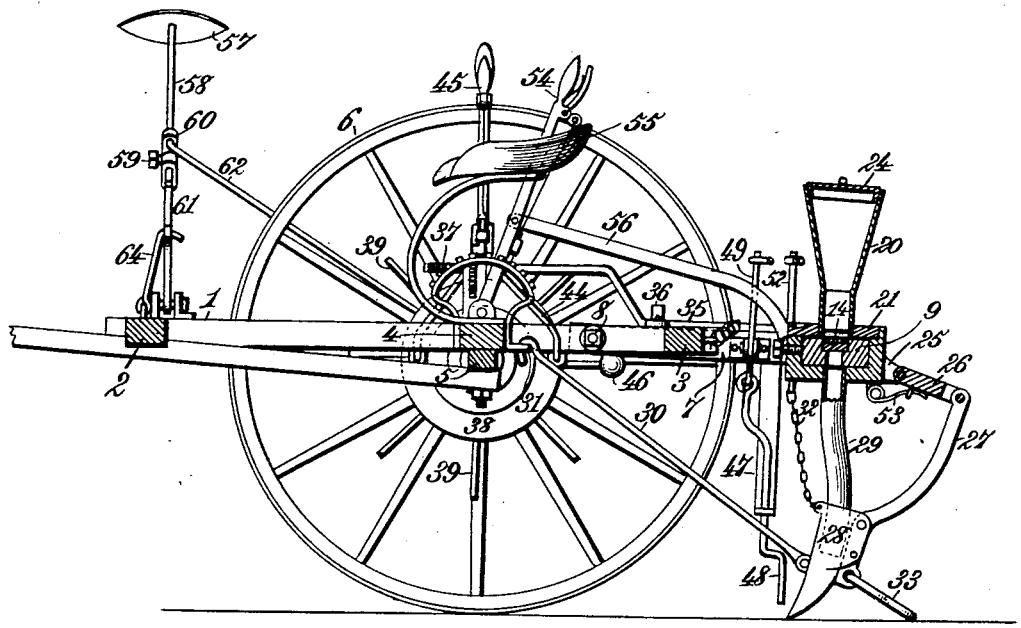
Fig. 2.
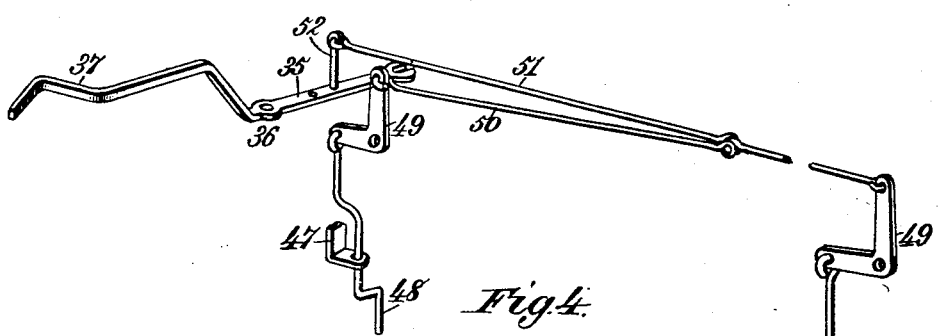
Fig. 3.
Fig. 4.
Witnesses.
Robert Everett
Dennis Lumly
Inventor:
Lorenzo W. Powell.
By James L. Norris.
Atty.
THE NORRIS PETERS CO., PHOTO-LITHO., WASHINGTON, D. C.

(No Model.)  3 Sheets—Sheet 3.
L. W. POWELL.
PLANTING AND SEEDING MACHINE.
No. 593,493. Patented Nov. 9, 1897.
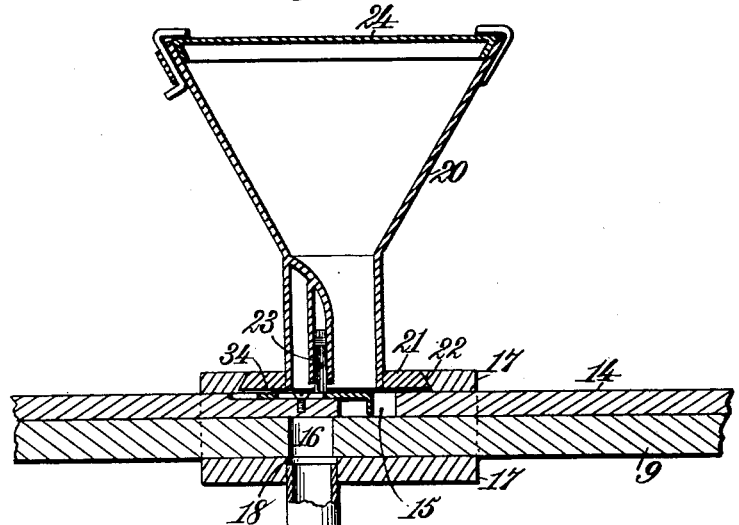
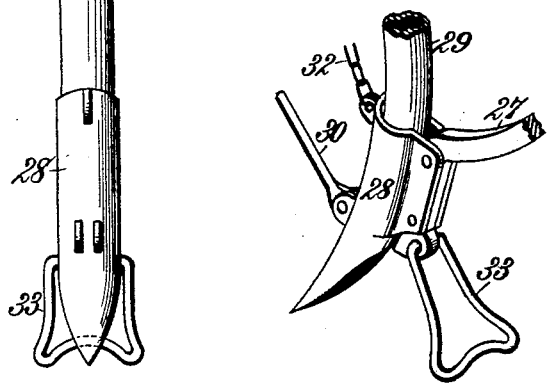
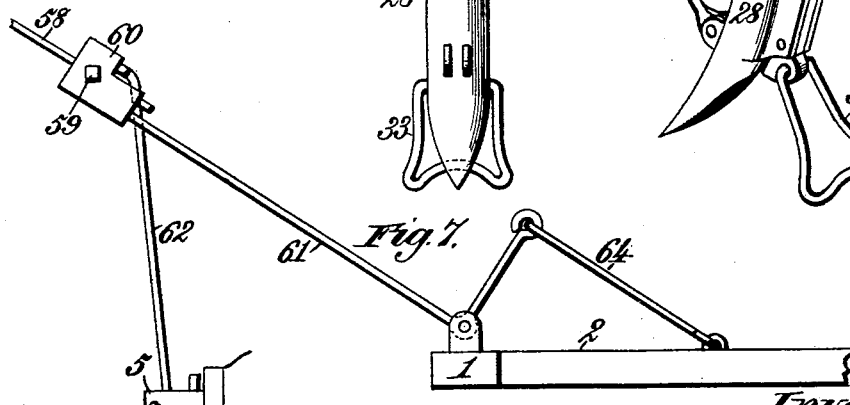
Witnesses.
Robert Corrett,
Dennis Sunly.
Inventor.
Lorenzo W. Powell.
By James L. Norris,
Atty.

UNITED STATES PATENT OFFICE.

LORENZO W. POWELL, OF KIRTLAND, OHIO.

PLANTING AND SEEDING MACHINE.

SPECIFICATION forming part of Letters Patent No. 593,493, dated November 9, 1897.

Application filed February 25, 1897. Serial No. 624,993. (No model.)

*To all whom it may concern:*

Be it known that I, LORENZO W. POWELL, a citizen of the United States, residing at Kirtland, and whose post-office address is Temple, in the county of Lake and State of Ohio, have invented new and useful Improvements in Planting and Seeding Machines, of which the following is a specification.

This invention relates to planting and seeding machines designed more particularly for planting corn and beans, but capable also of use for depositing or drilling any seeds to be planted in rows.

It is a principal object of the invention to provide an improved and easily-operated machine that can be readily adjusted for planting seeds in hills at any required distance apart and several rows at a time with speed and accuracy.

The invention consists in features of construction and novel combinations of parts in a corn-planter and seeding-machine, as hereinafter described and claimed.

In the annexed drawings, illustrating the invention, Figure 1 is a plan of my improved corn-planter and seeding-machine. Fig. 2 is a vertical longitudinal section of the same on the line 2 2 of Fig. 1. Fig. 3 is a detail view of the mechanism for operating the seed valve or slide and the hill-markers. Fig. 4 is an enlarged view of the disk for actuating the lever of the seed-valve. Fig. 5 is an enlarged sectional view of the seed-dropping mechanism. Figs. 6 and 7 are detail views.

The main frame of the machine is a rectangular structure comprising parallel side bars 1, a transverse front bar 2, rear transverse bar 3, and an intermediate transverse bar 4, as shown. To the under side of this frame is secured the axle 5, on the ends of which the supporting and carrying wheels 6 are loosely mounted.

For the purpose of carrying the seeding mechanism there is provided a supplemental frame comprising side bars 7, that are connected to the main frame by means of pivots 8, and there is carried on the rear ends of these pivoted side bars 7 a removable transversely-arranged hopper-bar 9, on which the hoppers and seed-valve are carried.

The construction of the machine-frame in two parts, as above described, with hinged connection at the pivots 8, will enable the main or fore part of the frame to take any position, as by tilting forward or backward, without interfering with the working of the supplemental or rear part of the frame and seeding mechanism connected therewith.

The rear ends of the pivotal side bars 7 are preferably reduced in thickness or provided with tenons 10 to engage with mortises in the ends of the transversely-arranged hopper-bar 9, which is removably secured in place by means of pins 12, as shown. A longitudinally-extended groove 13 is formed in the top of the hopper-bar 9 to receive a seed valve or slide 14, in which is a series of openings 15 to register with similar openings 16 in the bottom of the groove 13 when the seed-valve 14 is moved a sufficient distance in the proper direction.

On the grooved hopper-bar 9 is arranged a number of slidable or laterally-adjustable blocks 17, which are recessed or mortised, so as to fit around said bar and be readily movable thereon. In the bottom of each laterally-adjustable slide-block 17 is an opening 18, that will register with one of the openings 16 in the hopper-bar. Each slide-block is provided with a set-screw 19 to hold the said block in its adjusted position. In the drawings three slide-blocks 17 are shown on the hopper-bar 9, while the said hopper-bar and the seed valve or slide 14 are each provided with a greater number of openings for passage of seed. This will permit a suitable range of lateral adjustment for the slide-blocks and attached seed-hoppers and drills to vary the distance between the rows of hills in which the corn or seed is to be planted. The arrangement shown, with three slide-blocks and accompanying parts, will permit the planting of corn or other seed in three rows at once, say four feet apart or less; but it will be understood that the machine can be readily adapted to other requirements.

The seed-hoppers 20 are each provided with a flanged base-piece 21, through which the bottom of the hopper opens or extends. This hopper base-piece 21 has a detachable dovetail engagement with a recess 22 in the top of a slide-block 17, the said recess being so arranged as to permit communication between the bottom of the hopper and the openings 15, 16, and 18 when the slide-valve 14 is operated in the proper direction to drop the seed. In the bottom of each hopper 20 is a brush 23 to keep the top of the valve 14 clear from seed as the valve is reciprocated beneath the hopper and to insure the passage of the seed through the openings in the valve and hopper-bar. The action of the brush will prevent the sticking of the valve from the catching of seed on its top. Each seed-hopper may be provided with a cover or lid 24, having suitable fastenings.

On the rear of each slidable block 17 are lugs 25 to form a joint with a link 26, the rear end of which is pivotally connected with the upper end of a drill-standard 27, that is curved downward and forward below the hopper-bar. Each standard 27 carries at its lower and forward end a drill-tube 28, which connects, by a flexible seed-conducting tube 29, with an opening 18 in the under side of a slidable block 17 on the hopper-bar. The jointed connection of each standard 27 with a slide-block 17 will permit the said standard and tubes 28 29 to give back without injury to the drill-tube in the case of contact with obstructions. The drill-tube 28 may be braced by a rod 30, extended from said tube to a lug 31 on the transverse bar 4 of the main frame.

To accommodate the lateral adjustments of the seed-hoppers and drills along the hopper-bar 9, there may be provided a number of lugs 31 to be engaged by the respective brace-rods 30 of the several drill-tubes. Each drill-tube 28 may be also furnished with a stay-chain 32, extended to the forward portion of the hopper-carrying slide-block. To the lower end of each standard 27 there is pivotally attached, at the rear of each drill-tube 28, a coverer 33 for causing the earth to cover the seed. The curved shape of the standard 27 is to bring the drill-tube 28 under the seed-opening 18 in the block 17, to which the flexible tube 29 is attached.

By withdrawing the pins 12 the hopper-bar 9 can be disconnected from the pivotal side bars 7 to permit removal and replacement of the slidable blocks 17 and attached seeding devices whenever desired. A suitable lateral adjustment of the seed-hoppers and connected seeding mechanism will enable the distance between the rows of hills to be varied at will.

There may be attached to the seed-valve 14 adjacent to each opening 15 therein a slide 34, adjustable to and from said opening to regulate the quantity of seed to be delivered to each drill-tube.

For the purpose of operating the seed-valve 14 there is connected therewith the rear end of a lever 35, that is fulcrumed at 36 on one of the pivotal side bars 7 of the rear hinged or supplemental frame. At its other end the lever 35 is extended upward and forward and is provided with a lateral cam projection 37 above the hub of the adjacent wheel of the machine. On this wheel-hub is mounted a disk 38, carrying a series of radial arms 39, so that when the said disk is clutched to the hub of the wheel to revolve therewith in the forward movement of the machine the said disk-arms 39 will successively ride over the cam projection 37 of the lever 35 and exert such pressure against said cam projection as to force the forward end of the lever 35 laterally inward against the force of a spring 40, one end of which is attached to the rear portion of the lever 35 and its other end to the rear bar 3 of the main section of the machine-frame. By the action of the radial disk-arms 39 on the lever cam projection 37, alternating with the tension of the spring 40, there will be imparted a reciprocating movement to the slide-valve 14 for dropping the seed in hills at suitable intervals.

The disk 38 is provided with clutch-teeth 41, corresponding with clutch-teeth 42 on the wheel-hub. An annular groove 43 in the disk 38 provides engagement for the hooked ends of rods 44, connecting with a clutch-operating lever 45, that is mounted on the bar 4 of the main frame. This lever 45 provides for clutching and unclutching the disk 38 to control the operation of the seeding mechanism, as desired.

To provide for variations in the required distance between the hills in a row, the disk 38 may be provided with any number of radial arms 39 that may be preferred.

It will be observed that one of the disk-arms 39 is provided with a weight 46 on its end. This weighted arm will be used for the purpose of regulating the position of the disk 38 for operating the seed-valve 14 under certain conditions. For instance, let it be supposed that the machine is to be employed for planting corn in four-foot rows and dropping in hills four feet apart. In this case all but two of the radial disk-arms will be removed. One of these arms will be provided with the weight 46, and the other will be located diametrically opposite. The wheels 6 being eight feet in circumference and the disk 38 being clutched in gear with the wheel-hub to revolve therewith, then two drops will be made in each revolution of the wheel and disk, or four feet apart. In planting corn care must be taken to drop the hills in the new rows in perfect line with the hills in the last rows. With two radial arms in position on the disk, a light one and a weighted or top-heavy one, the machine is placed in line with the last hills planted in the last rows. The disk is now unclutched or thrown out of gear, so that the top-heavy radial arm will drop downward, thereby bringing the lighter one upward and into immediate operative connection with the incline or cam projection 37 on the operating-lever 35 of the seed-valve. The disk 38 is now pushed into gear with the wheel-hub, and as the machine advances the drop is made immediately. No matter what position the disk 38 is in when the machine stops as soon as the disk is thrown out of gear the weighted arm falls to the bottom, groove and having a series of adjustably-regulated seed-openings, a number of laterally-adjustable slide-blocks fitted around said bar and valve and provided with seed passages or openings, seed-hoppers detachably mounted on said slide-blocks, the drill-tubes supported from the slide-blocks, a valve-actuating lever having one end attached to the seed-valve and its other end provided with a cam projection extended above the hub of a machine-wheel, a disk clutched to the hub of said wheel and provided with radial arms to actuate the valve-lever by bearing against said cam projection, and a spring for returning said valve-lever, substantially as described.

4. In a planting or seeding machine, the combination of the forward main-frame section, an adjustable rear-frame section having a detachable transverse hopper-bar, seed-hoppers and drill-tubes laterally adjustable on said bar, a reciprocating seed-valve to control discharge from all the hoppers, a valve-actuating lever having one end attached to the seed-valve and its other end provided with a cam projection extended above the hub of a machine-wheel, a loosely-mounted disk adapted to be clutched to the hub of said wheel and provided with radial arms to actuate the valve-lever through engagement with the cam projection thereon, a weight on one of said arms, a clutch-lever, hill-markers carried by the rear-frame section and operated from the valve-actuating lever, and a spring for said lever, substantially as described.

5. In a planting or seeding machine, the combination of a wheeled frame, the hopper-bar having a series of seed-openings, a reciprocating seed-valve extended along said bar and having a series of seed-openings adapted by the movement of said valve to register with the seed-openings of said bar, a number of laterally-adjustable seed-hoppers carried on the hopper-bar, drill-standards having jointed connections with the hopper-supports, springs for said jointed connections, drill-tubes carried by the said standards, flexible conducting-tubes connecting the drill-tubes with the hoppers, row-markers carried by adjustable stems that are pivotally connected with the machine-frame, one on each side, and hooks to hold either of said row-markers elevated when not in use, substantially as described.

In testimony whereof I have hereunto set my hand in presence of two subscribing witnesses.

LORENZO W. POWELL.

Witnesses:
NEWTON P. CRAWFORD,
DAVID H. PROPER.

thereby rotating the loose disk and carrying the lighter radial arm fully to the top and ready to operate on the valve-actuating lever as soon as the disk is again clutched with the wheel-hub. The disk 38 is clutched and unclutched by means of the lever 45 and its connections. By drawing the disk away from the wheel, so that it can turn loosely on the hub, the wheel is allowed to revolve without operating the seed-dropping mechanism.

To each pivotal side piece 7 of the rear or supplemental frame-section is secured a depending guide 47 for a vertically-movable hill-marker 48 for marking each outside hill at each drop. The upper end of each hill-marker 48 is attached to the horizontal arm of a bell-crank lever 49, one of which is attached to each side of the supplemental or rear hinged frame. The vertical arms of the two bell-crank levers 49 are connected by a rod 50, so that the hill-markers 48 will operate in unison. To the rod 50 is attached one end of a rod 51, the other end of which connects with a lug 52 on the lever 35, that operates the seed-valve. Thus at each reciprocation of the seed-valve 14 the hill-markers 48 are operated to mark the outside hills.

By mounting the seeding mechanism and the hill-markers on a rear hinged portion of the machine-frame the markers, the drill-tubes, and the tube-standards will readily adjust themselves to any irregularities in the field. The double-jointed arrangement of the standards 27 and their attaching-links 26 allows each standard to take a slightly backward and upward movement when coming in contact with an obstruction, thus preventing it from catching and obviating liability to breakage. Each standard works independently, and under each block 17 and attached link 26 is a spring 53, which brings the standard 27 and drill-tube 28 back to proper place after passing over an obstruction.

The hinged rear section of the machine-frame and seeding mechanism carried thereon may be raised to lift the drill-tubes clear from the ground when turning at the end of rows or when running on the road. This is accomplished by means of a lever 54, which, like the lever 45, is mounted adjacent to the driver's seat 55 on a transverse bar of the main frame. A connecting rod or bar 56 joins this lever 54 with the hopper-bar 9 of the rear hinged frame and permits said rear frame to be raised or lowered, as desired.

There are two row-markers 57, one on each side of the machine. When either one is in use, the other is supported in an elevated and inoperative position. In the preferred construction shown each row-marker 57 is attached to a rod or stem 58, adjustably held by means of a set-screw 59 in a block or coupling 60, having secured therein one end of an angle-lever 61, the shorter arm of which is pivotally attached to one of the forward corners of the main portion of the machine-frame. A brace-rod 62 connects with the coupling-block 60 and has a hooked end to engage in a perforation 63 in a projecting end of the wheel-axle. When the use of either row-marker is not required, it is lifted from the ground and secured in an elevated position by means of a hook 64, engaging an eye 65 in the marker-supporting lever.

It is obvious that the machine can be constructed with any dimensions or capacity desired and that it may be arranged for operation by either one or two horses, with suitable draft appliances attached to the main frame.

What I claim as my invention is—

1. In a planting or seeding machine, the combination of the forward main-frame section, an adjustable rear-frame section comprising side bars pivotally attached to the rear of the main frame and a removable transversely-arranged hopper-bar carried on the rear ends of said side bars, a series of laterally-adjustable seed-hoppers and connected drill-tubes carried on said hopper-bar, a reciprocating seed-valve for controlling discharge from all the seed-hoppers, vertically-movable hill-markers carried in guides depending from the side bars of the rear frame, an operating-lever having connections with the seed-valve and hill-markers, a disk adapted to be clutched to the hub of a machine-wheel and provided with radial arms to engage and actuate the said lever for operating the seed-valve and hill-markers, a lifting-lever mounted on the main-frame section, and a rod connecting said lever with the adjustable rear-frame section to lift the seeding mechanism and hill-markers from the ground, substantially as described.

2. In a planting or seeding machine, the combination of the forward main-frame section, the adjustable rear-frame section provided with a removable transversely-arranged hopper-bar having therein a longitudinal groove and a series of seed-openings in said groove, a reciprocating seed-valve extended throughout said groove and provided with a corresponding number of seed-openings, laterally-adjustable slide-blocks mounted to fit around the said hopper-bar and valve and provided with seed openings or passages, seed-hoppers on said slide-blocks, forwardly-curved drill-standards having jointed connection with said laterally-adjustable blocks, drill-tubes carried by said standards, flexible tubes connecting the drills with the openings in said blocks, hill-markers carried by the rear adjustable frame, and mechanism for actuating the seed-valve and hill-markers from the forward movement of the machine, substantially as described.

3. In a planting or seeding machine, the combination of the forward main frame, the hinged rear frame, the detachable hopper-supporting bar carried by said rear frame and provided with a longitudinal groove having therein a series of seed-openings, a reciprocating seed-valve extended throughout said